US012579434B2

(12) United States Patent
Nguyen et al.

(10) Patent No.: US 12,579,434 B2
(45) Date of Patent: Mar. 17, 2026

(54) TRAINING A NEURAL NETWORK USING AN ACCELERATED GRADIENT WITH SHUFFLING

(71) Applicant: International Business Machines Corporation, Armonk, NY (US)

(72) Inventors: Lam Minh Nguyen, Ossining, NY (US); Huyen Trang Tran, Ithaca, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 869 days.

(21) Appl. No.: 17/865,029

(22) Filed: Jul. 14, 2022

(65) Prior Publication Data

US 2024/0020528 A1 Jan. 18, 2024

(51) Int. Cl.
*G06N 3/00* (2023.01)
*G06N 3/08* (2023.01)

(52) U.S. Cl.
CPC ..................................... *G06N 3/08* (2013.01)

(58) Field of Classification Search
None
See application file for complete search history.

(56) References Cited

U.S. PATENT DOCUMENTS 10,019,470 B2 * 7/2018 Birdwell .................. G06N 3/10
10,572,800 B2 2/2020 Wang et al.

| | | | |
|---|---|---|---|
| 11,003,989 B2 | 5/2021 | Ho | |
| 11,568,171 B2 * | 1/2023 | Nguyen | G06N 3/09 |
| 11,811,645 B1 * | 11/2023 | Reth | G06N 20/00 |
| 11,947,668 B2 * | 4/2024 | Harang | G06V 10/764 |
| 12,114,243 B2 * | 10/2024 | Yang | H04W 4/80 |
| 2017/0270409 A1 * | 9/2017 | Trischler | G06F 40/284 |
| 2019/0050727 A1 | 2/2019 | Anderson et al. | |
| 2021/0073661 A1 * | 3/2021 | Matlick | H04L 61/3025 |
| 2021/0232734 A1 | 7/2021 | Baayen | |
| 2021/0294781 A1 * | 9/2021 | Fernández Musoles | G06N 3/09 |
| 2022/0171996 A1 | 6/2022 | Nguyen et al. | |
| 2022/0198275 A1 | 6/2022 | Baker | |

(Continued)

OTHER PUBLICATIONS

Jiang; Neural network training; Univ of Rochester; 24 pages; 2022.*

(Continued)

*Primary Examiner* — Radu Andrei
(74) *Attorney, Agent, or Firm* — Garg Law Firm, PLLC; Rakesh Garg; Stosch Sabo

(57) ABSTRACT

An index sequence specifying an index of training data corresponding to a component of a cost function is generated. A first model parameter in the set of model parameters is set to an initial value. Using the index sequence, a neural network model comprising a set of weights is trained. As part of the training, using the index sequence, a learning rate, and a set of gradients, a subset of the set of model parameters is updated. As part of the training, a momentum term is set. As part of the training, using the momentum term as the first model parameter, the updating and the setting are repeated until reaching a training completion condition. The trained neural network model is used to predict an outcome by analyzing live data.

25 Claims, 8 Drawing Sheets

(56) References Cited

U.S. PATENT DOCUMENTS

| | | | | |
|---|---|---|---|---|
| 2022/0406404 | A1* | 12/2022 | Kuznetsov | G16C 20/30 |
| 2023/0274478 | A1* | 8/2023 | Turgutlu | G06T 11/60 |
| | | | | 345/629 |

OTHER PUBLICATIONS

Jonathan; Early Phase of Neural Network Training; MIT; 20 pages; 2019.*

Khomenko; Accelerating_recurrent_neural_network_training; IEEE; pp. 100-103; 2016.*

Wang; Accelerating neural Network Training; Georgia IT; 12 pages; 2017.*

Hu et al., Accelerated Gradient Methods for Stochastic Optimization and Online Learning, Advances in Neural Information Processing Systems, vol. 22. Curran Associates, Inc., 2009.

Lan, An optimal method for stochastic composite optimization, Mathematical Programming, 133:365-397, Jan. 1, 2011.

Mishchenko et al., Random reshuffling: Simple analysis with vast improvements, 34th Conference on Neural Information Processing Systems (NeurIPS 2020), 2020.

Nemirovski et al., Robust stochastic approximation approach to stochastic programming, SIAM J. on Optimization, vol. 19, No. 4, pp. 1574-1609, 2009.

Nesterov, A method of solving a convex programming problem with convergence rate O(1/k2), Soviet Math. Dokl., vol. 27, No. 2, pp. 372-376, 1983.

Nesterov, Introductory lectures on convex optimization: A basic course, Applied Optimization, Kluwer Academic Publishers, vol. 87, 2004.

Nguyen et al., A unified convergence analysis for shuffling-type gradient methods, Journal of Machine Learning Research, 22 (207), pp. 1-44, Sep. 2021.

Polyak, Some methods of speeding up the convergence of iteration methods, USSR Computational Mathematics and Mathematical Physics, vol. 4, No. 5, pp. 1-17, 1964.

Robbins et al., A stochastic approximation method, The Annals of Mathematical Statistics, vol. 22, No. 3, pp. 400-407, 1951.

Shamir et al., Stochastic gradient descent for non-smooth optimization: Convergence results and optimal averaging schemes, 30th International Conference on Machine Learning, vol. 28, pp. 71-79, Jun. 17-19, 2013.

Vaswani et al., Fast and faster convergence of SGD for over-parameterized models (and an accelerated perceptron), Proceedings of the 22nd International Conference on Artificial Intelligence and Statistics, vol. 89, pp. 1195-1204, PMLR, Apr. 16-18, 2019.

Zhong et al., Accelerated Stochastic Gradient Method for Composite Regularization, Proceedings of the 17th International Conference on Artificial Intelligence and Statistics, vol. 33, pp. 1086-1094, Apr. 22-25, 2014.

Zhou et al., SGD converges to global minimum in deep learning via star-convex path, ICLR, 2019.

* cited by examiner

Figure 3:
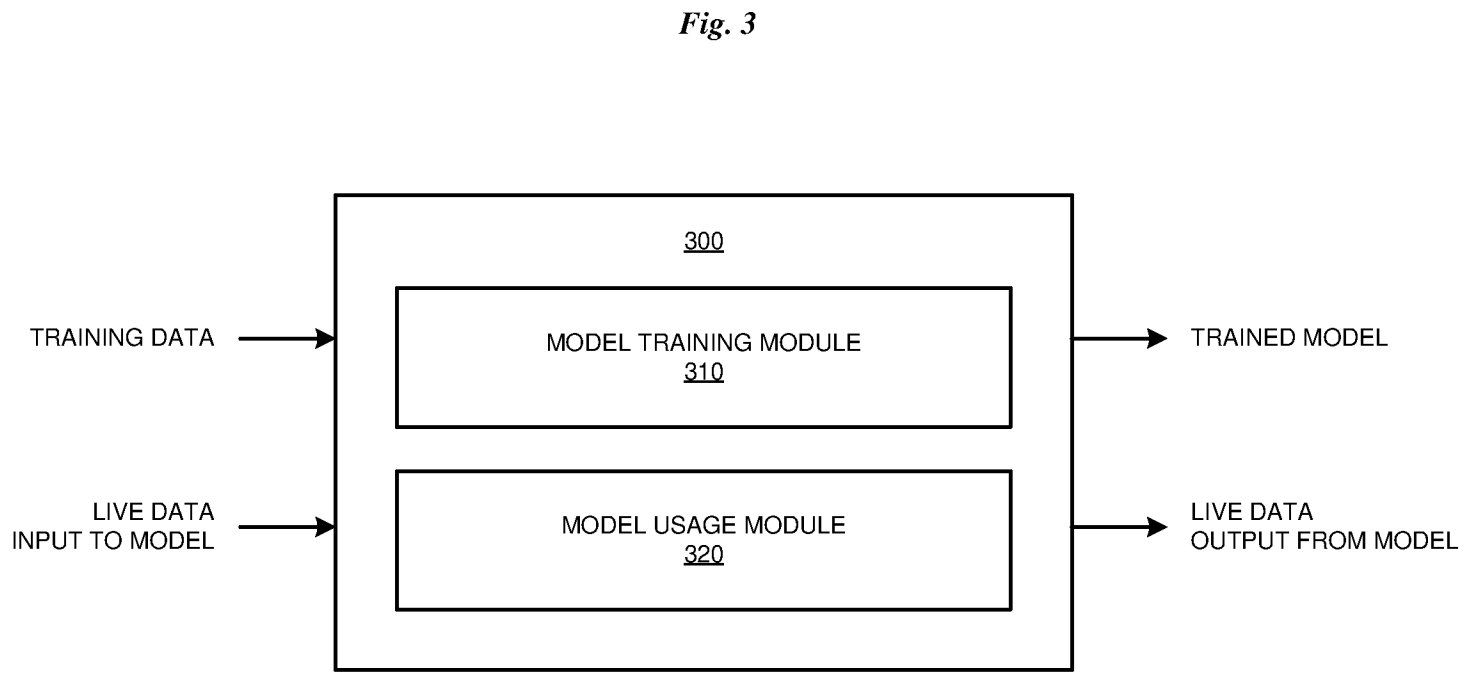

MODEL TRAINING MODULE
310

MODEL USAGE MODULE
320

TRAINING DATA

LIVE DATA
INPUT TO MODEL

TRAINED MODEL

LIVE DATA
OUTPUT FROM MODEL

TRAINING DATA SEQUENCE GENERATOR MODULE
410

UPDATE MODULE
420

CONVERGENCE ACCELERATION MODULE
430

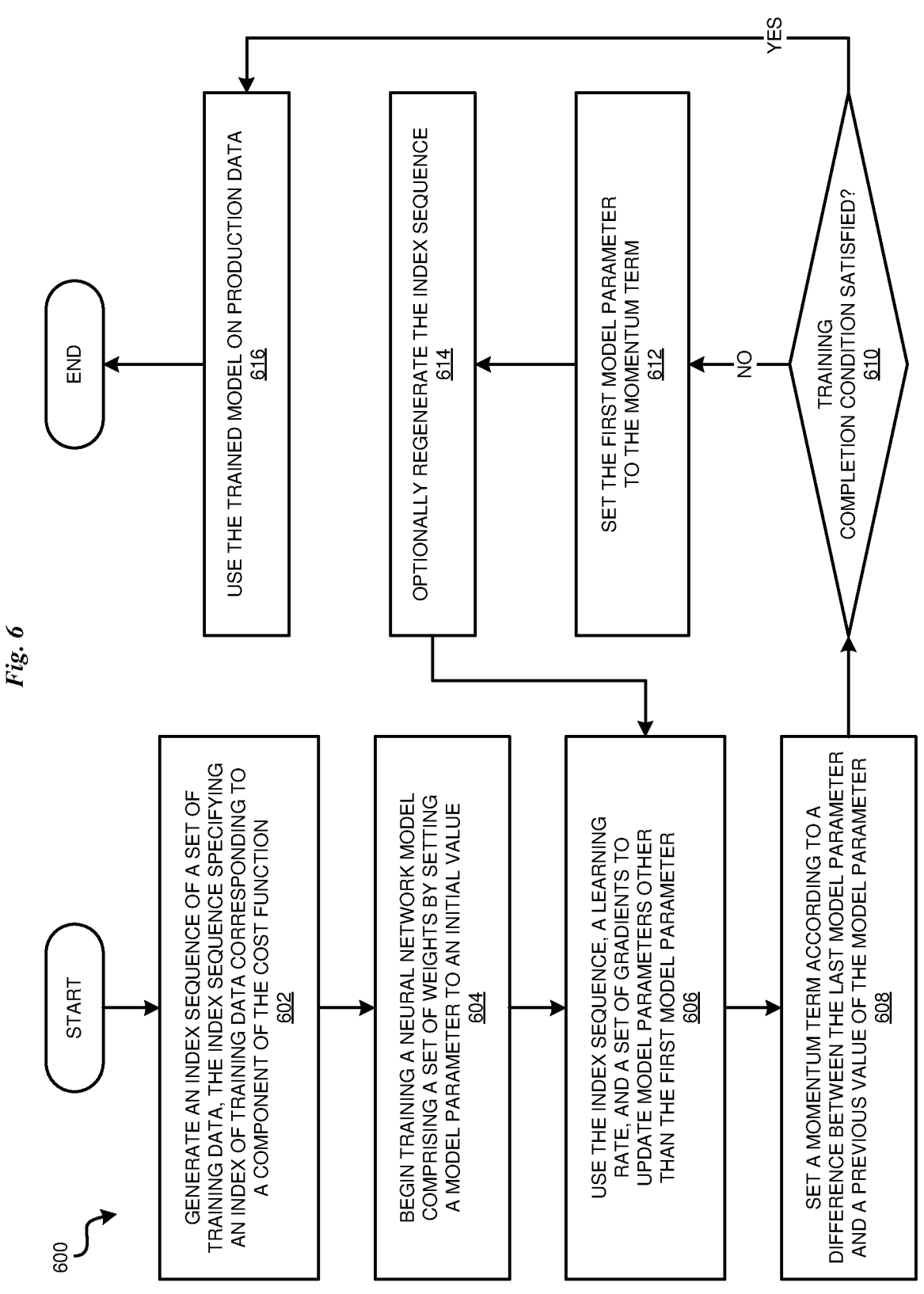

*Fig. 6*

START

GENERATE AN INDEX SEQUENCE OF A SET OF TRAINING DATA, THE INDEX SEQUENCE SPECIFYING AN INDEX OF TRAINING DATA CORRESPONDING TO A COMPONENT OF THE COST FUNCTION
602

BEGIN TRAINING A NEURAL NETWORK MODEL COMPRISING A SET OF WEIGHTS BY SETTING A MODEL PARAMETER TO AN INITIAL VALUE
604

USE THE INDEX SEQUENCE, A LEARNING RATE, AND A SET OF GRADIENTS TO UPDATE MODEL PARAMETERS OTHER THAN THE FIRST MODEL PARAMETER
606

SET A MOMENTUM TERM ACCORDING TO A DIFFERENCE BETWEEN THE LAST MODEL PARAMETER AND A PREVIOUS VALUE OF THE MODEL PARAMETER
608

TRAINING COMPLETION CONDITION SATISFIED?
610

NO

YES

SET THE FIRST MODEL PARAMETER TO THE MOMENTUM TERM
612

OPTIONALLY REGENERATE THE INDEX SEQUENCE
614

USE THE TRAINED MODEL ON PRODUCTION DATA
616

END

600

TRAINING A NEURAL NETWORK USING AN ACCELERATED GRADIENT WITH SHUFFLING

BACKGROUND

The present invention relates generally to a method, system, and computer program product for training a neural network. More particularly, the present invention relates to a method, system, and computer program product for training a neural network using an accelerated gradient with shuffling.

An artificial neural network, or simply neural network, includes layers of nodes. The node layers include an input layer, one or more hidden layers, and an output layer. Each node, or artificial neuron, connects to another and has an associated weight and threshold. Weights help determine the importance of any given input. At each node, all inputs are multiplied by their respective weights and then summed, and the result passed to the next layer of the network (optionally through an activation function or other threshold mechanism). Training a neural network involves adjusting node weights and other neural network parameters so that the neural network's output matches desired values for particular inputs.

Gradient descent is an optimization technique that is often used to train neural networks and other machine learning models. The goal of gradient descent is to minimize a cost function, i.e. an error between predicted and actual model outputs, over a series of iterations. In each iteration, the local gradient of the cost function is measured, and model parameters are adjusted to move the cost function in the opposite direction of the gradient. Thus, each iteration moves the cost function along a direction of steepest descent until the cost function is close to or at zero (and thus the model's error is at minimum). At this point, the model is considered sufficiently trained and the iterations are stopped. Training is also stopped if the cost function fails to reach a minimum after a predetermined number of iterations, or if additional training fails to alter the cost function by more than a threshold amount. The cost function's reaching a minimum is also called convergence, and the rate of change of the cost function is referred to as the convergence rate. The adjusted model parameters are typically a set of weights of nodes in a neural network, but other model parameters may also be adjusted based on the cost function. Learning rate (also referred to as step size) is the size of the steps that are taken to reach the minimum, and is typically an adjustable parameter of the learning process. A higher learning rate results in larger steps, and thus a faster training process, but risks overshooting the minimum. Conversely, a lower learning rate has smaller steps, which is likely to result in finding the minimum more precisely, but requires additional iterations and is thus less efficient than a higher learning rate. In some training implementations, the learning rate is initialized with an initial value which is lowered as training progresses.

A training epoch, or epoch, refers to a complete pass over the training data. Gradient descent computes a gradient for each point in a training set, updating the model only after the gradients of all training examples have been evaluated once in an epoch. In stochastic gradient descent, a randomly-selected sampling of the training examples is evaluated in each training iteration, and an epoch has been completed when all training samples have been used. As used herein, randomly-selected refers to the use of a pseudo-random number generated by a pseudo-random number generator.

Cost functions with different characteristics are presently available. For example, regularized least squares regression and regularized logistic regression are often used in training models to perform linear regression and binary classification. Both are optimization problems with convex function, meaning that they do not have local minima, only global minima. Because convex functions behave in ways that are convenient for optimization, models trained using convex functions are easier to train to a global minimum than models using other types of cost functions.

The illustrative embodiments recognize that, because neural networks and other models must be trained before use on production data, there is a need to perform the training as efficiently as possible. For example, gradient descent when using a convex cost function converges on the order of 1 divided by the number of epochs. Stochastic gradient descent when using a convex cost function converges on the order of 1 divided by the square root of the number of epochs, or on the order of 1 divided by $T^{2/3}$ (where T denotes the number of epochs) when the training data set is reshuffled using various presently known techniques. Because stochastic gradient descent operates on sampled training data rather than all of the training data, stochastic gradient descent is more memory-efficient and computation-efficient during training than gradient descent. Thus, the illustrative embodiments recognize that there is a need to improve model training convergence rates to be faster, and thus better, than those exhibited by stochastic gradient descent.

The illustrative embodiments also recognize that convex cost functions are not applicable to every type of model being trained. For example, nonconvex cost functions often better approximate the behavior being modelled since the real-world behavior are often too complex to be modelled sufficiently accurately by a simpler, convex function. For example, deep neural networks include various layers of nodes and activation functions applied after the node layers, and because the activation functions are non-linear a nonconvex cost function is desirable when training deep neural networks. However, because nonconvex cost functions can have local minima that are not as low as a global minimum, convergence to a global solution using a nonconvex cost function is not generally guaranteed. Thus, the illustrative embodiments also recognize that a nonconvex cost function with improved convergence properties is also needed.

SUMMARY

The illustrative embodiments provide a method, system, and computer program product. An embodiment includes a method that generates an index sequence of a set of training data, the index sequence specifying an index of training data corresponding to a component of a cost function. An embodiment sets a first model parameter in a set of model parameters to an initial value. An embodiment training, using the index sequence, a neural network model comprising a set of weights, the training comprising: updating, using the index sequence, a learning rate, and a set of gradients, a subset of the set of model parameters, the subset comprising the set of model parameters excluding the first model parameter; setting, using a difference between an updated value of a second model parameter in the set of model parameters and a previous value of the second model parameter, a momentum term; and repeating, using the momentum term as the first model parameter, the updating and the setting, the repeating performed until reaching a training completion condition. An embodiment uses, to predict an outcome by analyzing live data, the trained neural network model. Thus, the embodiment provides training of a neural network using an accelerated gradient with shuffling.

In another embodiment, the index sequence is predetermined. Thus the embodiment provides training of a neural network using an accelerated gradient with a predetermined index sequence.

In another embodiment, the index sequence is generated, using a pseudo-random number generator, prior to the training. Thus the embodiment provides training of a neural network using an accelerated gradient with an index sequence generated prior to the training.

In another embodiment, the index sequence is generated, using a pseudo-random number generator, prior to each iteration of the training. Thus the embodiment provides training of a neural network using an accelerated gradient with an index sequence generated prior to each iteration of the training.

In another embodiment, a model parameter in the set of model parameters comprises a value of a weight in the set of weights. Thus the embodiment provides training of a neural network using an accelerated gradient with shuffling, wherein a model parameter set during training comprise a value of a weight of the neural network.

In another embodiment, a cost function satisfies a property in which a set of changes in the cost function between current values of the set of model parameters and an optimal set of model parameters is bounded within a threshold of a convex evaluation term and a squared distance between current values of the set of model parameters and an optimal set of model parameters, wherein the optimal set of model parameters comprises a set of predetermined values. Thus the embodiment provides training of a neural network using an accelerated gradient with shuffling, using a cost function satisfying a particular property.

In another embodiment, the training completion condition comprises a change in an average of values of the set of model parameters that is less than a threshold amount. Thus the embodiment provides training of a neural network using an accelerated gradient with shuffling, using a particular training completion condition.

In another embodiment, the momentum term comprises a sum of the updated value of the second model parameter and a difference between the updated value of the second model parameter and a value of the second model parameter for a previous epoch, the difference multiplied by a predetermined value. Thus the embodiment provides training of a neural network using an accelerated gradient with shuffling, using a particular momentum term.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 3 depicts a block diagram of an example configuration for training a neural network using an accelerated gradient with shuffling in accordance with an illustrative embodiment;

FIG. 4 depicts a block diagram of an example configuration for training a neural network using an accelerated gradient with shuffling in accordance with an illustrative embodiment;

FIG. 6 depicts a flowchart of an example process for training a neural network using an accelerated gradient with shuffling in accordance with an illustrative embodiment;

DETAILED DESCRIPTION

Figure 1:
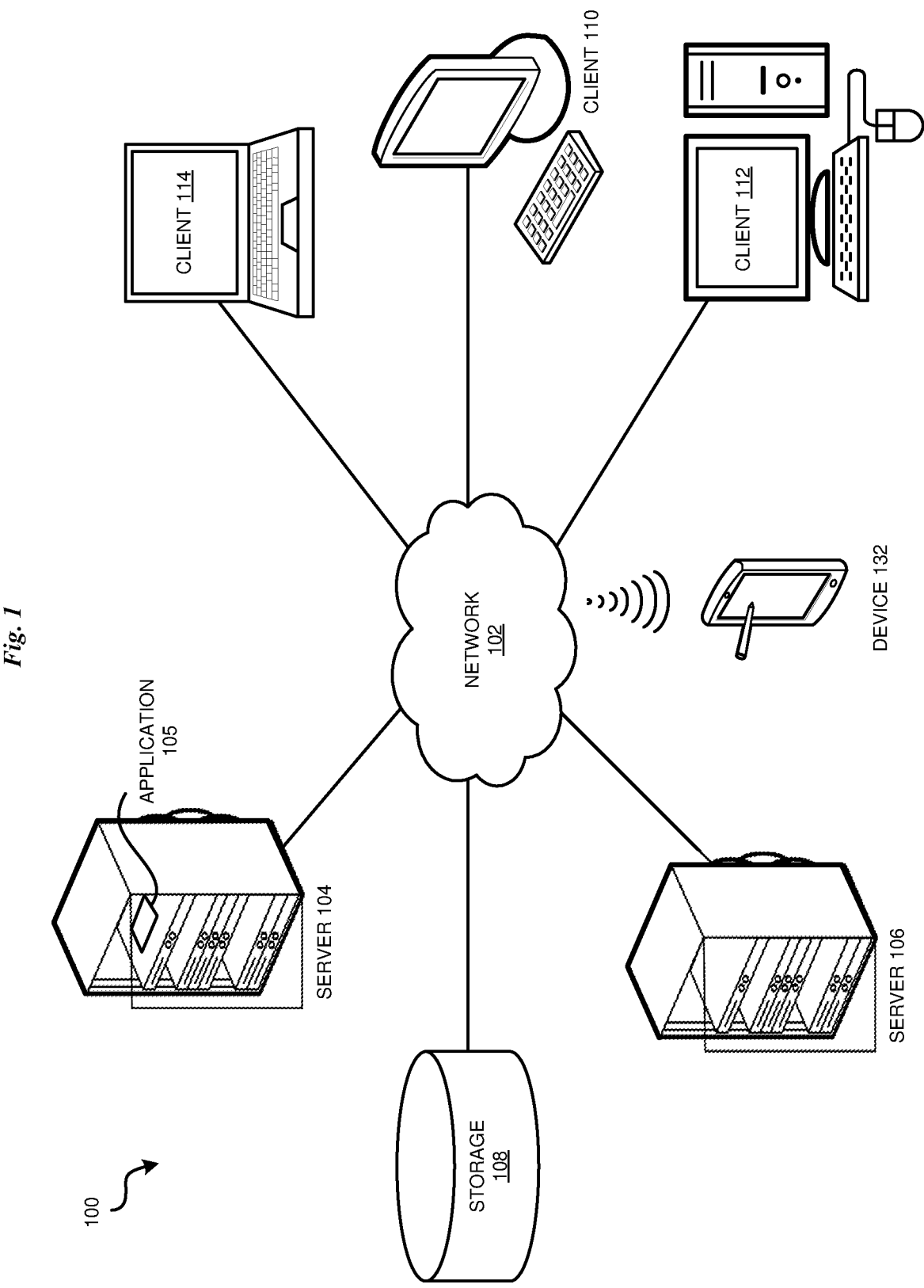
FIG. 1 depicts a block diagram of a network of data processing systems in which illustrative embodiments may be implemented.

The illustrative embodiments recognize that there is a need to improve convergence below the rates known for stochastic gradient descent. The illustrative embodiments also recognize that a nonconvex cost function with improved convergence properties is also needed.

The illustrative embodiments recognize that the presently available tools or solutions do not address these needs or provide adequate solutions for these needs. The illustrative embodiments used to describe the invention generally address and solve the above-described problems and other problems related to training a neural network using an accelerated gradient with shuffling.

An embodiment can be implemented as a software application. The application implementing an embodiment can be configured as a modification of an existing neural network training system, as a separate application that operates in conjunction with an existing neural network training system, a standalone application, or some combination thereof.

Particularly, some illustrative embodiments provide a method that generates an index sequence of a set of training data, sets model parameters to a set of initial values, trains, using the index sequence, a neural network model comprising a set of weights until reaching a training completion condition, and using, to make predictions on live data, the trained neural network model.

An embodiment generates an index sequence of a set of training data. The index sequence specifies an index of training data corresponding to a component of a cost function. In other words, the index sequence specifies which portion of training data is to be used in updating model parameters. In one embodiment, the index sequence includes indexes for all data in a set of training data. In another embodiment, the index sequence includes indexes for a randomly selected subset of all the data in the set of training data. One embodiment implements an incremental gradient index sequence shuffling scheme, in which the index sequence is predetermined and not changed during model training. Another embodiment implements a shuffle once index sequence shuffling scheme, in which the index sequence is randomly reordered once from a predetermined starting sequence, before model training begins, but not thereafter. Another embodiment implements a random reshuffle index sequence shuffling scheme, in which the index sequence is randomly reordered at each training epoch. The index sequence applicable to a particular epoch t can be represented symbolically as $p^{(t)}$ from a set of n indexes of training data represented by [n].

An embodiment sets an initial value of a model parameter to a predetermined or random value. In other words, an embodiment selects the zeroth model parameter, represented by $y_0^{(t)}$. In one embodiment, a model parameter is a set of weights in the nodes of a neural network.

In each training epoch, an embodiment optionally reshuffles the index sequence, then computes a set of model parameters other than the zeroth model parameter. In other words, an embodiment computes model parameters $y_i^{(t)}$, where i represents a version of model parameters, from 1 to n. To compute model parameters 1 to n, an embodiment uses the index sequence, a learning rate, and a set of gradients to update model parameters with indexes other than 0. Thus, represented symbolically an embodiment computes:

$$y_i^{(t)} := y_{i-1}^{(t)} - \eta_i^{(t)} \nabla f\left(y_{i-1}^{(t)}; \pi^{(t)}(i)\right):$$

in which $y_i^{(t)}$ denotes the current epoch t's model parameter at iteration i, $y_{i-1}^{(t)}$ denotes model parameter at iteration (i−1) for the previous epoch t−1, $h_i^{(t)}$ denotes a learning rate for the current iteration i and epoch t, and $$\nabla f\left(y_{i-1}^{(t)}; \pi^{(t)}(i)\right):$$

denotes a gradient of the cost function corresponding to the sample index $p^{(t)}$ (i). A gradient comprises a direction and magnitude of the change in a cost function f ( ) at a point. A gradient is similar to a derivative of the function, but computed in multiple dimensions, and is a presently available technique. One non-limiting example of computing a gradient when training a neural network uses auto-differentiation, a presently available algorithm for computing a gradient automatically based on a graph of the neural network's nodes and layers.

In each training epoch, an embodiment uses the last model parameter, denoted by $y_n^{(t)}$, to compute a momentum term. In particular, an embodiment computes:

$$\text{Set } \tilde{x} := y_n^{(t)};$$

$$\text{Update } \tilde{y}_t := \tilde{x}_t + \gamma_t(\tilde{x}_t - \tilde{x}_{t-1});$$

where $g_t$ denotes a scalar parameter that controls the behavior of the momentum term. An appropriate choice of $g_t$ helps to accelerate the convergence rate by using convex properties of a cost function being used to compute the gradient. In the next training epoch, an embodiment uses the momentum term to set an initial value of the zeroth model parameter, in other words:

$$y_0^{(t)} := \tilde{y}_{t-1};$$

and repeats the model parameter updates.

An embodiment repeats the model parameter updates, in subsequent training epochs, until reaching a training completion condition. In one embodiment, the training completion condition comprises a change in the average of the model parameters that is less than a threshold amount. In one embodiment, the training completion condition comprises a change in the average of the model parameters that is less than a threshold amount after the number of training epochs is above a second threshold amount. Other training completion conditions are also possible and contemplated within the scope of the illustrative embodiments.

In one embodiment the cost function is a class of non-convex function that satisfies a property in which changes in cost function between the model weights $w_{i-1}^{(t)}$ and an optimal set of weight values w* is nicely bounded within some threshold of a convex evaluation term (the term multiplied by M) and the squared distance between $w_i^{(t)}$ and $w_0^{(t)}$. In other words, the cost function satisfies:

$$\left\|\nabla f\left(w_{i-1}^{(t)}; \pi^{(t)}(i)\right) - \nabla f\left(w_*; \pi^{(t)}(i)\right)\right\|^2 \le$$
$$M\left\langle \nabla f\left(w_{i-1}^{(t)}; \pi^{(t)}(i)\right) - \nabla f\left(w_*; \pi^{(t)}(i)\right), w_{i-1}^{(t)} - w_* \right\rangle + N\frac{1}{n}\sum_{i=1}^{n}\left\|w_i^{(t)} - w_0^{(t)}\right\|^2,$$

where M and N are constants >0, t represents an epoch from 1 to the total number of epochs T, i is an iteration index from 1 to n, $p^{(t)}$ represents the index sequence applicable to a particular epoch t, and w* is a global solution of F. In some neural network architectures with squared loss (a common choice of cost function that is widely used for neural network training, especially for use in regression problems), this non-convex cost function converges to a global solution, using the training methods described herein, when $\gamma_t$, the scalar parameter that controls the behavior of the momentum term, is zero. Other cost functions, also called loss functions, are also possible and contemplated within the scope of the illustrative embodiments. As one non-limiting example, the softmax cross entropy loss function, a presently known function is also convex, and widely used for classification problems as well as training neural network models.

Once a training completion condition has been reached, an embodiment considers the model to be sufficiently trained for use on live, rather than training data. Thus, an embodiment uses the trained model to make predictions on live data. For example, many machine learning models can be trained to solve problems using convex cost functions. Some non-limiting examples of trained machine learning models implement classification tasks (e.g. in computer vision, models that recognize faces, numbers, or other patterns) and regression problems (e.g. prediction models that predict future values of data, and make decisions according to the predicted future values, based on live data). For example, autonomous vehicles implement solutions to both problems, for example classifying whether a situation is dangerous or not, or predicting a future fuel level and deciding where to stop for more fuel.

The manner of training a neural network using an accelerated gradient with shuffling described herein is unavailable in the presently available methods in the technological field of endeavor pertaining to neural network training. A method of an embodiment described herein, when implemented to execute on a device or data processing system, comprises substantial advancement of the functionality of that device or data processing system in generating an index sequence of a set of training data, setting model parameters to a set of initial values, training, using the index sequence, a neural network model comprising a set of weights until reaching a training completion condition, and using, to make predictions on live data, the trained neural network model.

The illustrative embodiments are described with respect to certain types of models, neural networks, weights, cost functions, updates, training data, index sequences, iterations, completion conditions, thresholds, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
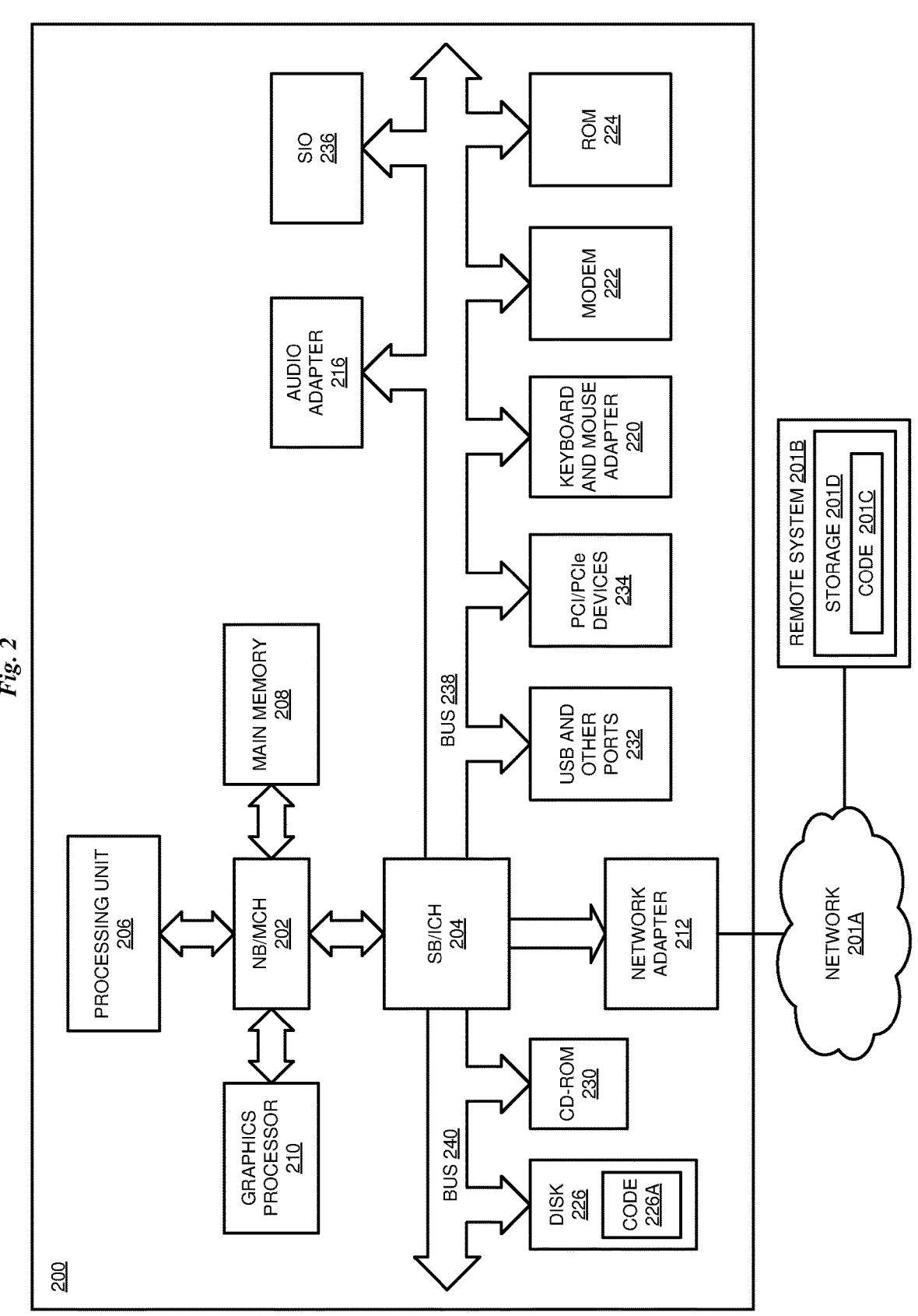
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

With reference to FIG. 3, this figure depicts a block diagram of an example configuration for training a neural network using an accelerated gradient with shuffling in accordance with an illustrative embodiment. Application 300 is an example of application 105 in FIG. 1 and executes in any of servers 104 and 106, clients 110, 112, and 114, and device 132 in FIG. 1.

Model training module 310 trains a model using training data, producing a trained model. More detail of module 310 is provided in the description of FIG. 4 herein. Model usage module 320 uses the trained model to make predictions on live (non-training) input data, producing live output data.

Figure 4:
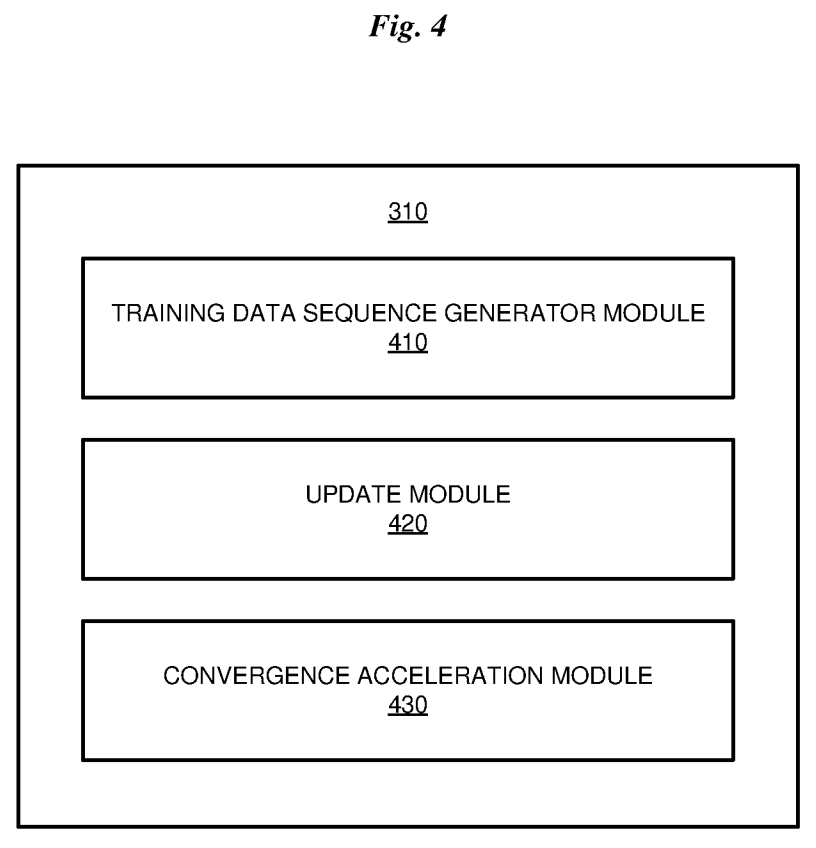

With reference to FIG. 4, this figure depicts a block diagram of an example configuration for training a neural network using an accelerated gradient with shuffling in accordance with an illustrative embodiment. In particular, FIG. 4 depicts more detail of module 310 in FIG. 3.

Training data sequence generator module 410 generates an index sequence of a set of training data. The index sequence specifies an index of training data corresponding to a component of a cost function. In other words, the index sequence specifies which portion of training data is to be used in updating model parameters. In one implementation of module 410, the index sequence includes indexes for all data in a set of training data. In another implementation of module 410, the index sequence includes indexes for a randomly selected subset of all the data in the set of training data. One implementation of module 410 implements an incremental gradient index sequence shuffling scheme, in which the index sequence is predetermined and not changed during model training. Another implementation of module 410 implements a shuffle once index sequence shuffling scheme, in which the index sequence is randomly reordered once from a predetermined starting sequence, before model training begins, but not thereafter. Another implementation of module 410 implements a random reshuffle index sequence shuffling scheme, in which the index sequence is randomly reordered at each training epoch. The index sequence applicable to a particular epoch t can be represented symbolically as $p^{(t)}$, from a set of n indexes of training data represented by [n].

Update module 420 sets an initial value of a model parameter to a predetermined or random value. In other words, module 420 selects the zeroth model parameter, represented by $y_0^{(t)}$. In one implementation of module 420, a model parameter is the set of weights in the nodes of a neural network.

In each training epoch, module 410 optionally reshuffles the index sequence, then module 420 computes a set of model parameters other than the zeroth model parameter. In other words, module 420 computes model parameters $y_i^{(t)}$, where i represents an iteration, from 1 to n. To compute model parameters 1 to n, module 420 uses the index sequence, a learning rate, and a set of gradients to update model parameters with indexes other than 0. Thus, represented symbolically module 420 computes:

$$y_i^{(t)} := y_{i-1}^{(t)} - \eta_i^{(t)} \nabla f(y_{i-1}^{(t)}; \pi^{(t)}(i)):$$

in which $y_i^{(t)}$ denotes the current epoch t's model parameter at iteration i, $y_{i-1}^{(t)}$ denotes model parameter at iteration (i−1) for the previous epoch t−1, $h_i^{(t)}$ denotes a learning rate for the current iteration i and epoch t, and $$\nabla f(y_{i-1}^{(t)}; \pi^{(t)}(i)):$$

denotes a gradient of the cost function corresponding to the sample index $p^{(t)}$ (i). A gradient comprises a direction and magnitude of the change in a cost function f ( ) at a point. A gradient is similar to a derivative of the function, but computed in multiple dimensions, and is a presently available technique. One non-limiting example of computing a gradient when training a neural network uses auto-differentiation, a presently available algorithm for computing a gradient automatically based on a graph of the neural network's nodes and layers.

In each training epoch, convergence acceleration module 430 uses the last model parameter, denoted by $y_n^{(t)}$, to compute a momentum term. In particular, module 430 computes:

$$\text{Set } \tilde{x} := y_n^{(t)};$$

$$\text{Update } \tilde{y}_t := \tilde{x}_t + \gamma_t (\tilde{x}_t - \tilde{x}_{t-1});$$

where $g_t$ denotes a scalar parameter that controls the behavior of the momentum term. An appropriate choice of $g_t$ helps to accelerate the convergence rate by using convex properties of a cost function being used to compute the gradient. In the next training epoch, module 420 uses the momentum term to set an initial value of the zeroth model parameter, in other words:

$$y_0^{(t)} := \tilde{y}_{t-1};$$

and repeats the model parameter updates.

Module 310 repeats the model parameter updates, in subsequent training epochs, until reaching a training completion condition. In one implementation of module 310, the training completion condition comprises a change in the average of the model parameters that is less than a threshold amount. In one implementation of module 310, the training completion condition comprises a change in the average of the model parameters that is less than a threshold amount after the number of training epochs is above a second threshold amount.

In one implementation of module 420, the cost function is a class of non-convex function that satisfies a property in which changes in cost function between the model weights $w_{i-1}^{(t)}$ and an optimal set of weight values w* is nicely bounded within some threshold of a convex evaluation term (the term multiplied by M) and the squared distance between $w_i^{(t)}$ and $w_0^{(t)}$. In other words, the cost function satisfies:

$$\left\| \nabla f(w_{i-1}^{(t)}; \pi^{(t)}(i)) - \nabla f(w_*; \pi^{(t)}(i)) \right\|^2 \leq$$

$$M \langle \nabla f(w_{i-1}^{(t)}; \pi^{(t)}(i)) - \nabla f(w_*; \pi^{(t)}(i)), w_{i-1}^{(t)} - w_* \rangle + N \frac{1}{n} \sum_{i=1}^{n} \left\| w_i^{(t)} - w_0^{(t)} \right\|^2,$$

where M and N are constants >0, t represents an epoch from 1 to the total number of epochs T, i is an iteration index from 1 to n, $p^{(t)}$ represents the index sequence applicable to a particular epoch t, and w* is a global solution of F. In some neural network architectures with squared loss (a common choice of cost function that is widely used for neural network training, especially for use in regression problems), this non-convex cost function converges to a global solution, using the training methods described herein, when $\gamma_t$, the scalar parameter that controls the behavior of the momentum term, is zero.

Figure 5:
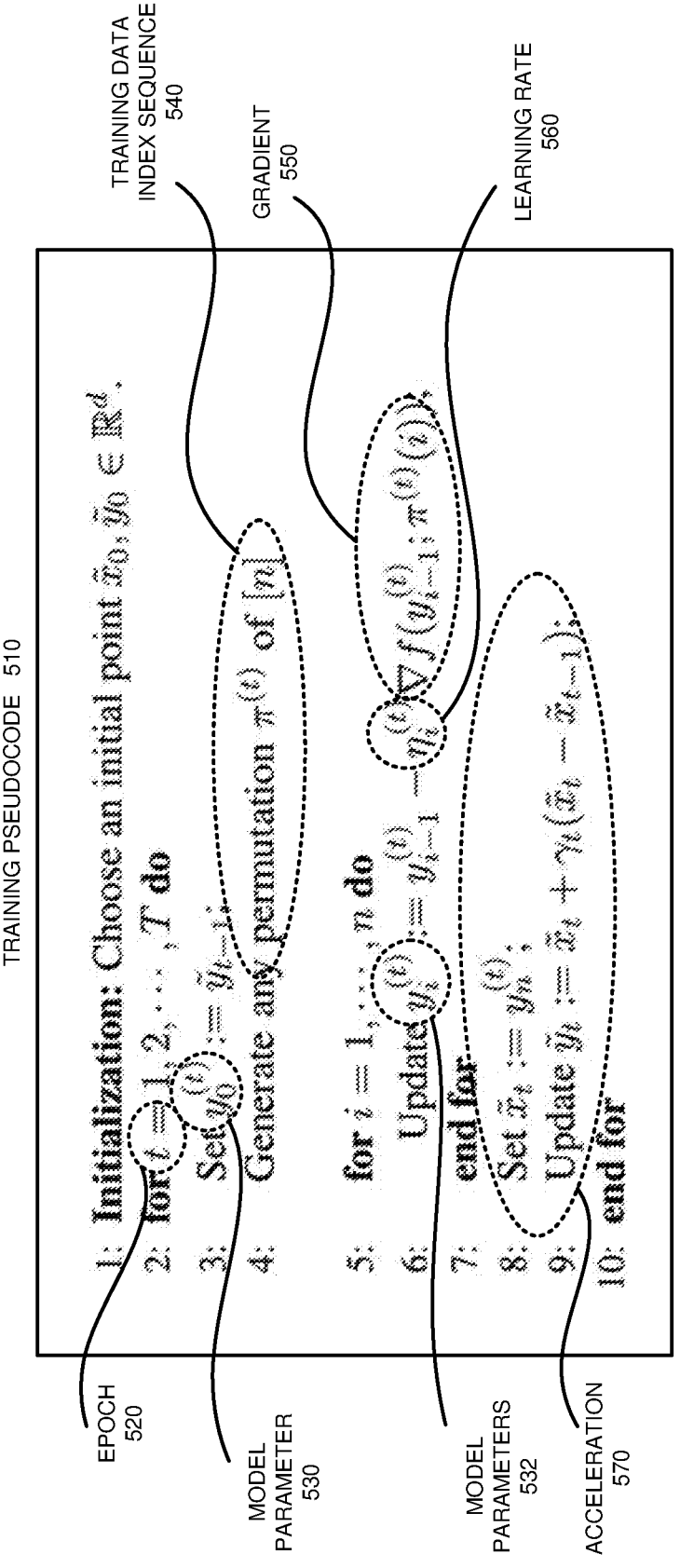
FIG. 5 depicts example pseudocode for training a neural network using an accelerated gradient with shuffling in accordance with an illustrative embodiment.

With reference to FIG. 5, this figure depicts example pseudocode for training a neural network using an accelerated gradient with shuffling in accordance with an illustrative embodiment. The pseudocode can be implemented in any suitable computer language, integrated into application 300 in FIG. 3, and executed in any of servers 104 and 106, clients 110, 112, and 114, and device 132 in FIG. 1.

In particular, FIG. 5 depicts training pseudocode 510. In line 1, an initial point is selected. No constraints on the initial point need be specified. Lines 2-10 denote code that is repeated for each training epoch, and variable t represents epoch 520. In line 3, the zeroth model parameter, model parameter 530, denoted by $y_0^{(t)}$, is set to an initial value, generally the momentum term from the previous epoch. In line 4, the pseudocode optionally reshuffles the index sequence, creating training data index sequence 540. In lines 5-7, the code computes a set of model parameters other than the zeroth model parameter. In other words, the code computes model parameters 532, denoted by $y_i^{(t)}$, where i represents an iteration index, from 1 to n. The code uses the index sequence, learning rate 560, and gradients 550 to update model parameters 532.

In lines 8-9, the code uses the last model parameter, denoted by $y_n^{(t)}$, to compute acceleration 570—a momentum term that is then used in the next training epoch as an initial value of the zeroth model parameter.

With reference to FIG. 6, this figure depicts a flowchart of an example process for training a neural network using an accelerated gradient with shuffling in accordance with an illustrative embodiment. Process 600 can be implemented in application 300 in FIG. 3.

In block 602, the application generates an index sequence of a set of training data, the index sequence specifying an index of training data corresponding to a component of the cost function. In block 604, the application begins training a neural network model comprising a set of weights by setting a model parameter to an initial value. In block 606, the application uses the index sequence, a learning rate, and a set of gradients to update model parameters other than the first model parameter. In block 608, the application sets a momentum term according to a difference between the last model parameter and a previous value of the model parameter. In block 610, the application determines whether a training completion condition is satisfied. If no ("NO" path of block 610), in block 612, the application sets the first model parameter to the momentum term. In block 614, the application optionally regenerates the index sequence, then returns to block 606 to repeat the training. Otherwise ("YES" path of block 610), in block 616, the application uses the trained model on production data. Then the application ends.

Figure 7:
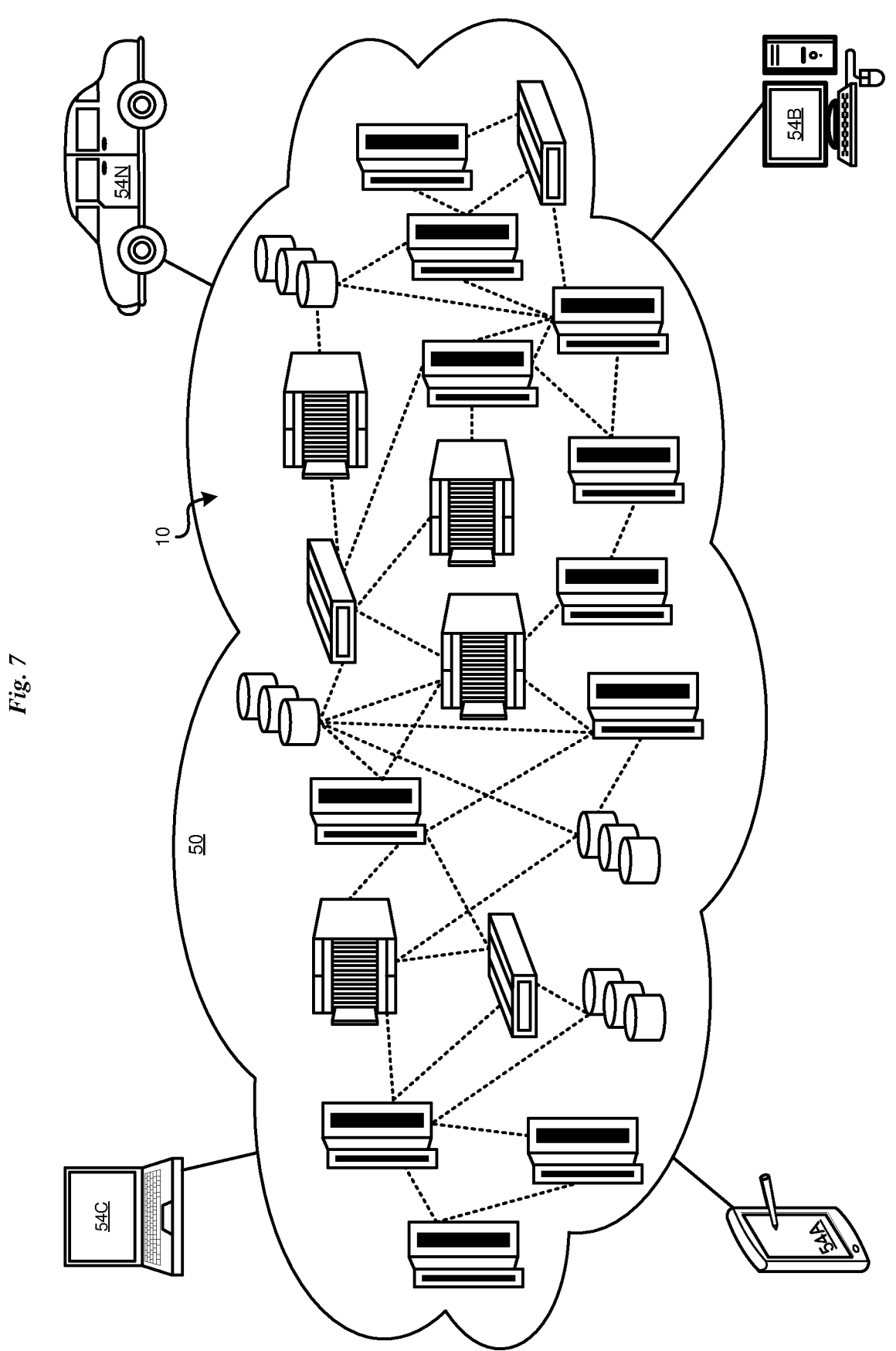
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 8:
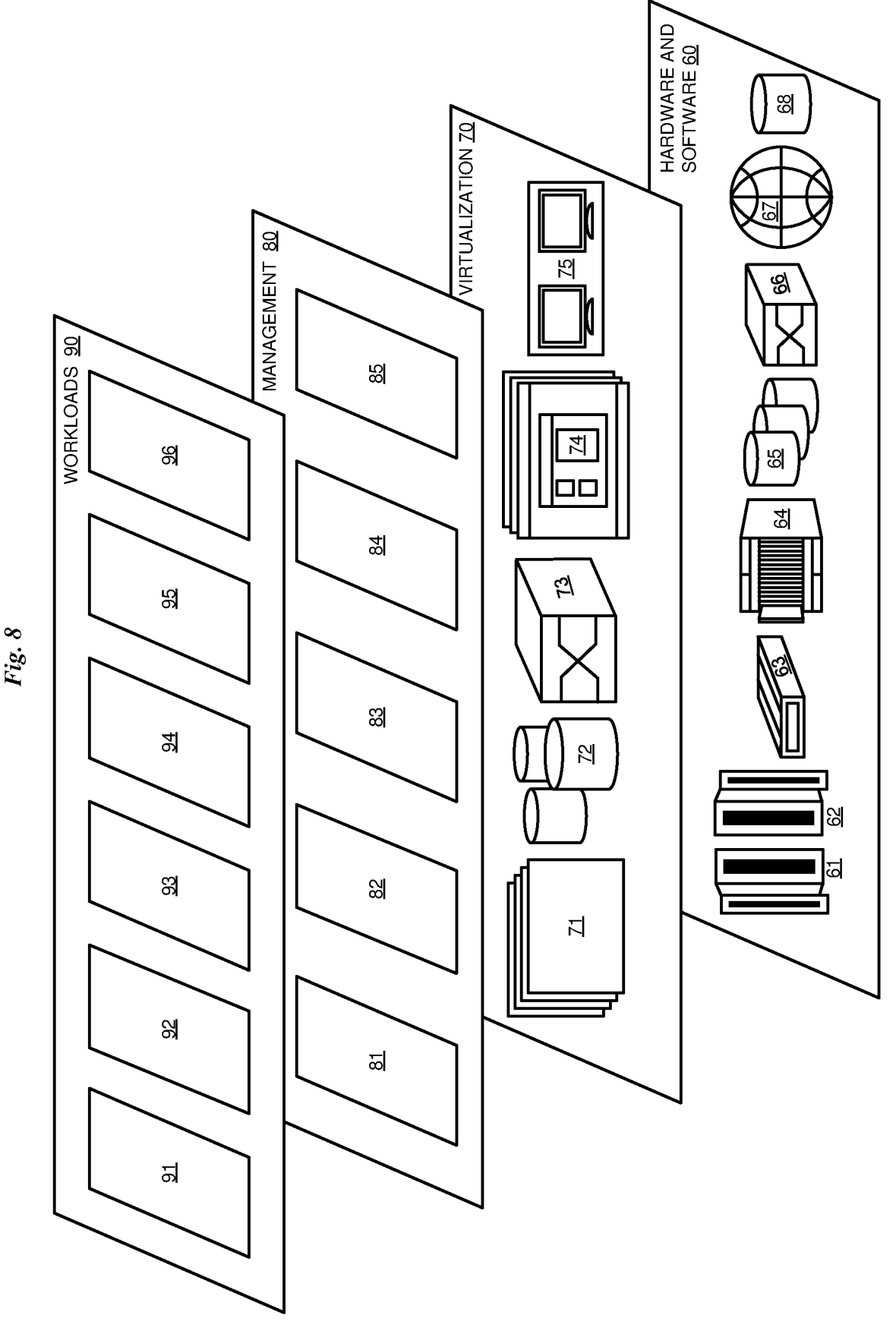
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for training a neural network using an accelerated gradient with shuffling and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:

constructing a neural network training system with an improved performance in a training of a neural network model, the constructing comprising:

generating an index sequence of a set of training data, the index sequence specifying an index of training data corresponding to a component of a cost function;

setting a first model parameter in a set of model parameters to an initial value;

training, using the index sequence, the neural network model comprising a set of weights, the training comprising:

executing code for updating, using the index sequence, a learning rate, and a set of gradients, a subset of the set of model parameters, the subset comprising the set of model parameters excluding the first model parameter;

executing code for setting, using a difference between an updated value of a second model parameter in the set of model parameters and a previous value of the second model parameter, a momentum term;

executing code for repeating, using the momentum term as the first model parameter, the updating and the setting, the repeating performed until reaching a training completion condition, to produce a trained neural network model with a faster convergence rate of the cost function in the training relative to a second convergence rate of the cost function in a second training of the neural network model using stochastic gradient descent; and using, to predict an outcome by analyzing live data, the trained neural network model.

2. The computer-implemented method of claim 1, wherein the index sequence is predetermined.

3. The computer-implemented method of claim 1, wherein the index sequence is generated, using a pseudo-random number generator, prior to the training.

4. The computer-implemented method of claim 1, wherein the index sequence is generated, using a pseudo-random number generator, prior to each iteration of the training.

5. The computer-implemented method of claim 1, wherein a model parameter in the set of model parameters comprises a value of a weight in the set of weights.

6. The computer-implemented method of claim 1, wherein the cost function satisfies a property in which a set of changes in the cost function between current values of the set of model parameters and an optimal set of model parameters is bounded within a threshold of a convex evaluation term and a squared distance between current values of the set of model parameters and an optimal set of model parameters, wherein the optimal set of model parameters comprises a set of predetermined values.

7. The computer-implemented method of claim 1, wherein the training completion condition comprises a change in an average of values of the set of model parameters that is less than a threshold amount.

8. The computer-implemented method of claim 1, wherein the momentum term comprises a sum of the updated value of the second model parameter and a difference between the updated value of the second model parameter and a value of the second model parameter for a previous epoch, the difference multiplied by a predetermined value.

9. A computer program product for training a neural network, the computer program product comprising:

one or more computer readable storage media, and program instructions collectively stored on the one or more computer readable storage media, the stored program instructions comprising:

program instructions to construct a neural network training system with an improved performance in a training of a neural network model, the program instructions to construct comprising:

program instructions to generate an index sequence of a set of training data, the index sequence specifying an index of training data corresponding to a component of a cost function;

program instructions to set a first model parameter in a set of model parameters to an initial value;

program instructions to train, using the index sequence, the neural network model comprising a set of weights, the training comprising:

program instructions to update, using the index sequence, a learning rate, and a set of gradients, a subset of the set of model parameters, the subset comprising the set of model parameters excluding the first model parameter;

program instructions to set, using a difference between an updated value of a second model parameter in the set of model parameters and a previous value of the second model parameter, a momentum term;

program instructions to repeat, using the momentum term as the first model parameter, the updating and the setting, the repeating performed until reaching a training completion condition, to produce a trained neural network model with a faster convergence rate of the cost function in the training relative to a second convergence rate of the cost function in a second training of the neural network model using stochastic gradient descent; and program instructions to use, to predict an outcome by analyzing live data, the trained neural network model.

10. The computer program product of claim 9, wherein the index sequence is predetermined.

11. The computer program product of claim 9, wherein the index sequence is generated, using a pseudo-random number generator, prior to the training.

12. The computer program product of claim 9, wherein the index sequence is generated, using a pseudo-random number generator, prior to each iteration of the training.

13. The computer program product of claim 9, wherein a model parameter in the set of model parameters comprises a value of a weight in the set of weights.

14. The computer program product of claim 9, wherein the cost function satisfies a property in which a set of changes in the cost function between current values of the set of model parameters and an optimal set of model parameters is bounded within a threshold of a convex evaluation term and a squared distance between current values of the set of model parameters and an optimal set of model parameters, wherein the optimal set of model parameters comprises a set of predetermined values.

15. The computer program product of claim 9, wherein the training completion condition comprises a change in an average of values of the set of model parameters that is less than a threshold amount.

16. The computer program product of claim 9, wherein the momentum term comprises a sum of the updated value of the second model parameter and a difference between the updated value of the second model parameter and a value of the second model parameter for a previous epoch, the difference multiplied by a predetermined value.

17. The computer program product of claim 9, wherein the stored program instructions are stored in the at least one of the one or more storage media of a local data processing system, and wherein the stored program instructions are transferred over a network from a remote data processing system.

18. The computer program product of claim 9, wherein the stored program instructions are stored in the at least one of the one or more storage media of a server data processing system, and wherein the stored program instructions are downloaded over a network to a remote data processing system for use in a computer readable storage device associated with the remote data processing system.

19. The computer program product of claim 9, wherein the computer program product is provided as a service in a cloud environment.

20. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:

program instructions to construct a neural network training system with an improved performance in a training of a neural network model, the program instructions to construct comprising:

program instructions to generate an index sequence of a set of training data, the index sequence specifying an index of training data corresponding to a component of a cost function;

program instructions to set a first model parameter in a set of model parameters to an initial value;

program instructions to train, using the index sequence, the neural network model comprising a set of weights, the training comprising:

program instructions to update, using the index sequence, a learning rate, and a set of gradients, a subset of the set of model parameters, the subset comprising the set of model parameters excluding the first model parameter;

program instructions to set, using a difference between an updated value of a second model parameter in the set of model parameters and a previous value of the second model parameter, a momentum term;

program instructions to repeat, using the momentum term as the first model parameter, the updating and the setting, the repeating performed until reaching a training completion condition, to produce a trained neural network model with a faster convergence rate of the cost function in the training relative to a second convergence rate of the cost function in a second training of the neural network model using stochastic gradient descent; and program instructions to use, to predict an outcome by analyzing live data, the trained neural network model.

21. The computer system of claim 20, wherein the index sequence is predetermined.

22. The computer system of claim 20, wherein the index sequence is generated, using a pseudo-random number generator, prior to the training.

23. The computer system of claim 20, wherein the index sequence is generated, using a pseudo-random number generator, prior to each iteration of the training.

24. A data processing environment comprising one or more processors, one or more computer-readable memories, and one or more computer-readable storage media, and program instructions stored on at least one of the one or more storage media for execution by at least one of the one or more processors via at least one of the one or more memories, the stored program instructions comprising:

program instructions to construct a neural network training system with an improved performance in a training of a neural network model, the program instructions to construct comprising:

program instructions to generate an index sequence of a set of training data, the index sequence specifying an index of training data corresponding to a component of a cost function;

program instructions to set a first model parameter in a set of model parameters to an initial value;

program instructions to train, using the index sequence, the neural network model comprising a set of weights, the training comprising:

program instructions to update, using the index sequence, a learning rate, and a set of gradients, a subset of the set of model parameters, the subset comprising the set of model parameters excluding the first model parameter;

program instructions to set, using a difference between an updated value of a second model parameter in the set of model parameters and a previous value of the second model parameter, a momentum term;

program instructions to repeat, using the momentum term as the first model parameter, the updating and the setting, the repeating performed until reaching a training completion condition, to produce a trained neural network model with a faster convergence rate of the cost function in the training relative to a second convergence rate of the cost function in a second training of the neural network model using stochastic gradient descent; and program instructions to use, to predict an outcome by analyzing live data, the trained neural network model.

25. A neural network model training system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:

program instructions to construct a neural network training system with an improved performance in a training of a neural network model, the program instructions to construct comprising:

program instructions to generate an index sequence of a set of training data, the index sequence specifying an index of training data corresponding to a component of a cost function;

program instructions to set a first model parameter in a set of model parameters to an initial value;

program instructions to train, using the index sequence, the neural network model comprising a set of weights, the training comprising:

program instructions to update, using the index sequence, a learning rate, and a set of gradients, a subset of the set of model parameters, the subset comprising the set of model parameters excluding the first model parameter;

program instructions to set, using a difference between an updated value of a second model parameter in the set of model parameters and a previous value of the second model parameter, a momentum term;

program instructions to repeat, using the momentum term as the first model parameter, the updating and the setting, the repeating performed until reaching a training completion condition, to produce a trained neural network model with a faster convergence rate of the cost function in the training relative to a second convergence rate of the cost function in a second training of the neural network model using stochastic gradient descent; and program instructions to use, to predict an outcome by analyzing live data, the trained neural network model.

\* \* \* \* \*